(12) United States Patent
Pinarbasi (10) Patent No.: US 6,226,158 B1
(45) Date of Patent: May 1, 2001

(54) HIGH OPERATING TEMPERATURE GOLD LEADS FOR A READ SENSOR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,912

(22) Filed: Jul. 30, 1999

(51) Int. Cl.[7] ........................................................ G11B 5/39
(52) U.S. Cl. ............................................................ 360/322
(58) Field of Search ..................................... 360/317, 322, 360/324.1, 326, 327

(56) References Cited

U.S. PATENT DOCUMENTS

| | | |
|---|---|---|
| 5,491,600 | 2/1996 | Chen et al. ............................ 360/113 |
| 5,717,547 | 2/1998 | Young ................................... 360/104 |
| 5,734,523 | 3/1998 | Scheidecker et al. ................ 360/103 |
| 5,754,369 | 5/1998 | Balakrishnan ........................ 360/104 |
| 5,757,585 | 5/1998 | Aoyagi et al. ........................ 360/104 |
| 5,821,494 | 10/1998 | Albrecht et al. ................. 219/121.64 |
| 5,946,167 * | 8/1999 | Hara et al. ............................. 360/113 |
| 6,039,792 * | 3/2000 | Calamur et al. ........................... 95/45 |
| 6,040,962 * | 3/2000 | Kanazawa et al. ................... 360/113 |
| 6,080,490 * | 6/2000 | Burrell et al. ......................... 428/461 |

* cited by examiner

Primary Examiner—Jefferson Evans
(74) Attorney, Agent, or Firm—Gray Cary Ware & Freidenrich; Ervin F. Johnston (57) ABSTRACT

A method of making gold (Au) lead layers for a read sensor forms the leads with micro voids which permit the leads to collapse slightly under operating pressures and temperatures to prevent nodule growth of the lead material at the air bearing surface. The method of making permits the use of gold (Au) leads which have high conductivity and high resistance to corrosion, but heretofore have been unacceptable for use in read heads because of nodule growth.

32 Claims, 11 Drawing Sheets

(ABS)

FIG. 11
(ABS)

FIG. 12

FIG. 13
(ABS)

HIGH OPERATING TEMPERATURE GOLD LEADS FOR A READ SENSOR

BACKGROUND OF THE INVENTION

1. Field of the Invention

The present invention relates to high operating temperature gold (Au) leads for a read sensor and, more particularly, to gold leads which will not flow out of a read head at the air bearing surface (ABS) when subjected to pressure and various temperatures under operating conditions.

2. Description of the Related Art

The heart of a computer is an assembly that is referred to as a magnetic disk drive. The magnetic disk drive includes a rotating magnetic disk, a slider that has write and read heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

The read head includes a sensor that is located between nonmagnetic electrically insulative first and second read gap layers and the first and second read gap layers are located between ferromagnetic first and second shield layers. In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The spin valve sensor is characterized by a magnetoresistive (MR) coefficient, also known as giant magnetoresistance (GMR), that is substantially higher than the MR coefficient of an anisotropic magnetoresistive (AMR) sensor. MR coefficient is dr/R were dr is the change in resistance of the spin valve sensor and R is the resistance of the spin valve sensor before the change.

Because of high conductance (low resistance) and resistance to corrosion, gold (Au) is a desirable material for the first and second leads that are connected to the read sensor. Pure gold (Au), when used as conductor leads, however, presents a problem due to nodule formation of the gold at the ABS. This is due to pressure and high temperatures within the head during operating conditions of the read head within a magnetic disk drive. The operating temperatures can vary between 80° C.–120° C. Pressure on the leads increases with an increase in temperature due to expansion of layers adjacent the leads such as the first and second read gap layers and the first and second shield layers which are adjacent the read gap layers. With pressure due to the aforementioned temperatures the gold (Au), which is soft, is squeezed out of the leads at the ABS of the read head causing the aforementioned nodules. The nodules can short the leads to the first and second shield layers or short across edge portions of sensitive elements of the read sensor causing a failure of the read head. Because of the problems with gold (Au) leads have been made from tantalum (Ta) which does not have the nodule problem. Unfortunately, tantalum (Ta) has a significantly higher resistance than gold (Au) which results in increased heating of the read head unless the thickness of the tantalum (Ta) lead layers is increased. Unfortunately, an increase in thickness of the lead layers causes steps adjacent the read sensor which are replicated by subsequent layers all the way to the write gap which can cause the write gap of the write head to be curved. This is known in the art as write gap curvature and causes the write head to write curved magnetic impressions into tracks of a rotating magnetic disk which are then read by sensors that read straight across. This causes a reduction in the read signal which equates to less storage capacity of the magnetic disk drive.

SUMMARY OF THE INVENTION

I have found a method of forming gold (Au) conductor leads for a read sensor which is resistant against nodule growth by withstanding the pressure at operating temperatures of a disk drive without being extruded in the form of nodules at the ABS. Prior art gold or gold alloy leads are typically sputtered in a sputtering chamber. Within the sputtering chamber are a target of the material to be sputtered, namely the gold or gold alloy, a substrate supporting a wafer upon which the gold leads are to be formed and an ion beam gun which directs an ion beam onto the target for sputtering gold atoms from the target onto the wafer. The sputtering chamber typically has an outlet for drawing a vacuum and an inlet for inserting an inert gas, such as argon (Ar), into the chamber. In the prior art surface planes of the target and the substrate are oriented substantially parallel with respect to one another. In the present invention the surface planes of the target and the substrate are oriented at an angle with respect to one another, such as 20°–40°, which is referred to hereinafter as oblique ion beam sputtering. I have discovered with this scheme that the density of the gold or gold alloy formed on the wafer is less than the natural or elemental density of the gold or gold alloy. This decreased density causes the gold or gold alloy to have a degree of porosity which permits the leads to be compressed or squeezed in place under pressure and operating temperatures of the read head without the material of the leads flowing from the leads to form nodules at the ABS. The gold or gold alloy leads may be entirely porous or there may be alternate gold and porous gold layers forming the leads, as desired. Further, the method may be employed for other lead material such as copper (Cu) or molybdenum (Mo).

An object of the present invention is to provide improved lead layers for a read sensor by forming them with an oblique sputter deposition scheme.

Another object is provide gold or gold alloy lead layers for a read sensor which have a reduced density as compared to elemental forms of the gold or gold alloy so that the gold or gold alloy lead layers can function at operating conditions without nodule growth at the ABS.

Other objects and advantages of the invention will become apparent upon reading the following description taken together with the accompanying drawings.

DESCRIPTION OF THE PREFERRED EMBODIMENTS

Magnetic Disk Drive

Figure 1:
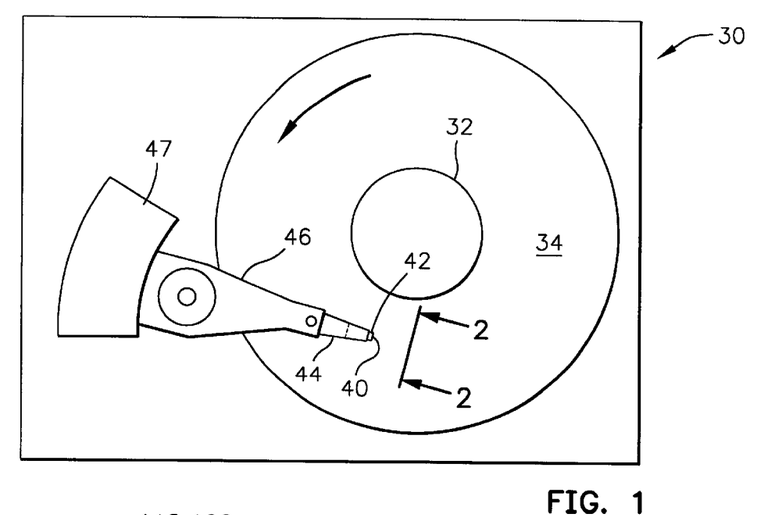
FIG. 1 is a plan view of an exemplary magnetic disk drive.
Figure 2:
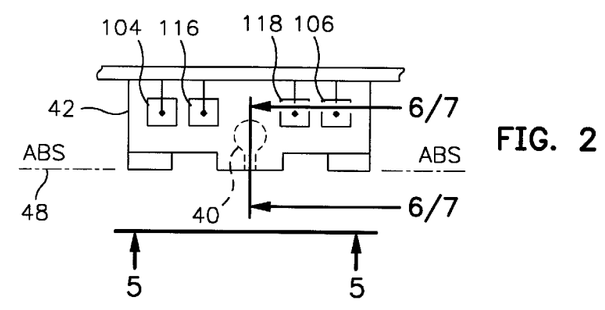
FIG. 2 is an end view of a slider with a magnetic head of the disk drive as seen in plane 2—2.
Figure 3:
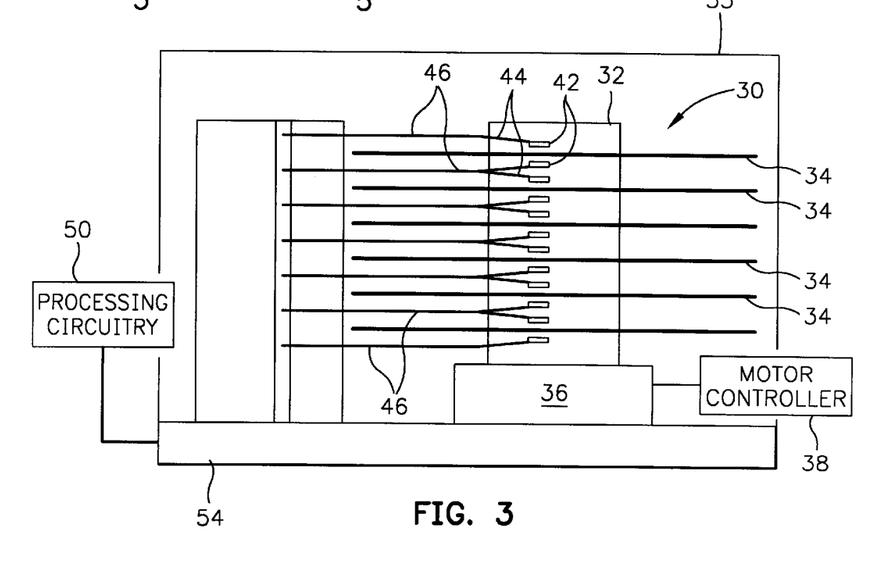
FIG. 3 is an elevation view of the magnetic disk drive wherein multiple disks and magnetic heads are employed.
Figure 4:
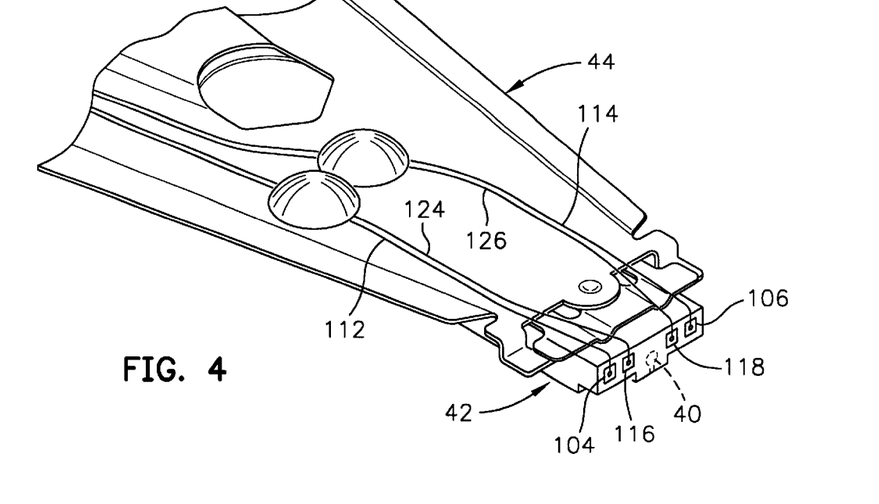
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
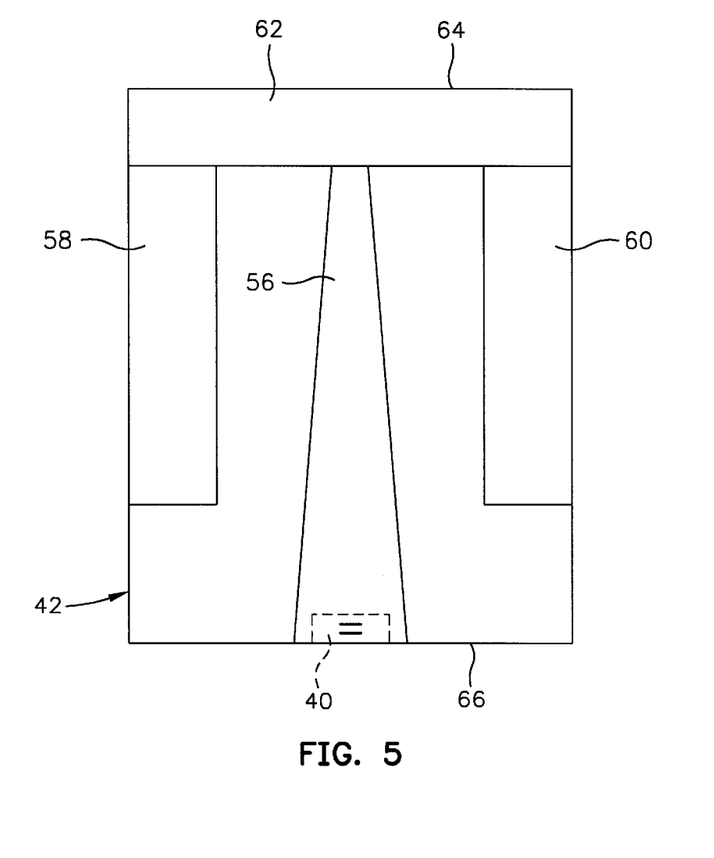
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
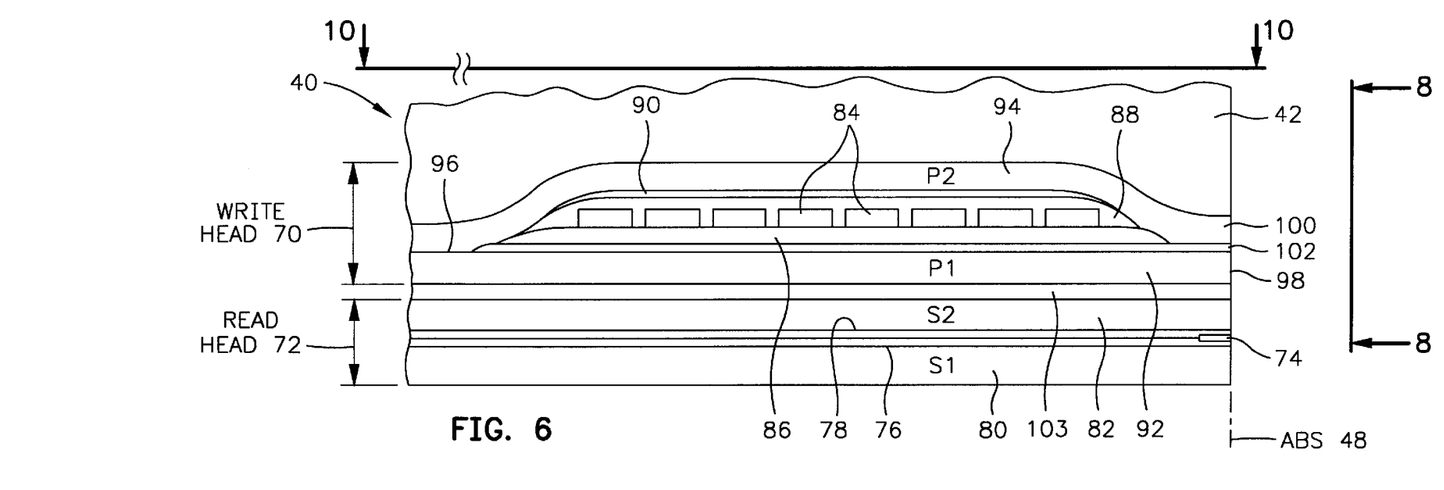
FIG. 6 is a partial view of the slider and a piggyback magnetic head as seen in plane 6—6 of FIG. 2.
Figure 8:
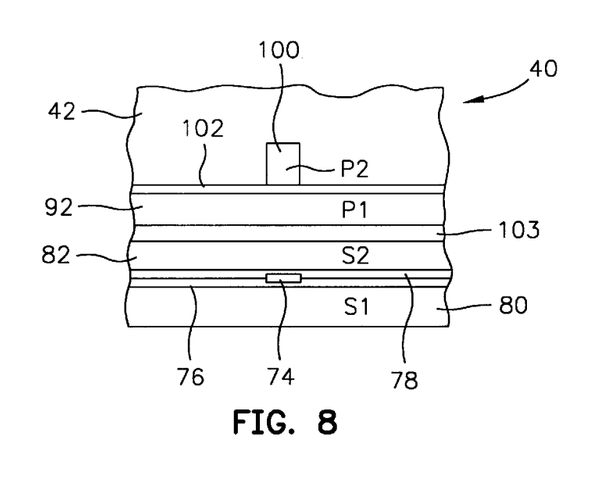
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
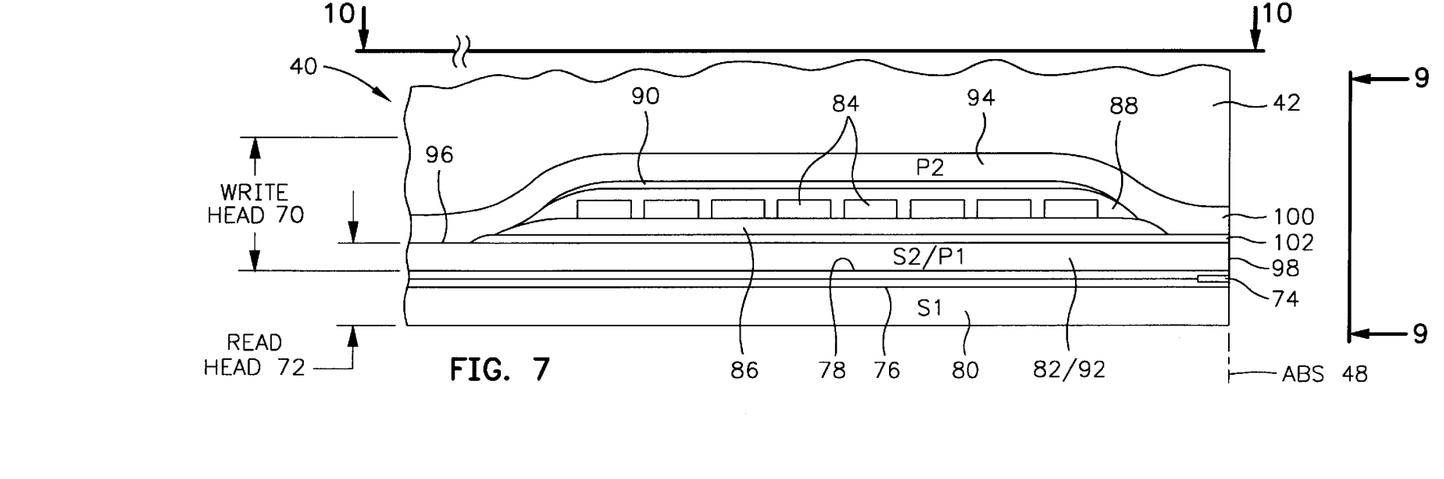
FIG. 7 is a partial view of the slider and a merged magnetic head as seen in plane 7—7 of FIG. 2.
Figure 9:
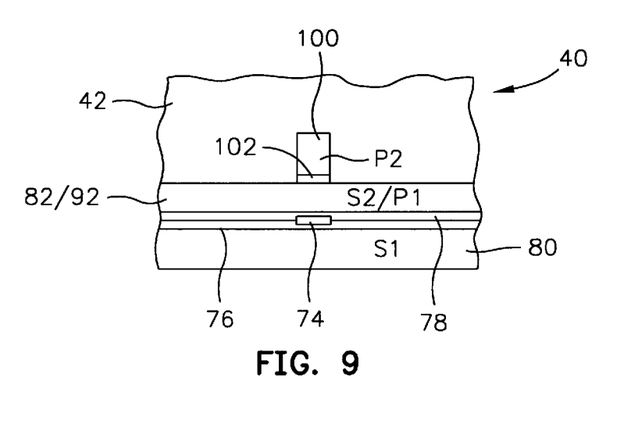
FIG. 9 is a partial ABS view of the slider taken along plane 9—9 of FIG. 7 to show the read and write elements of the merged magnetic head.
Figure 10:
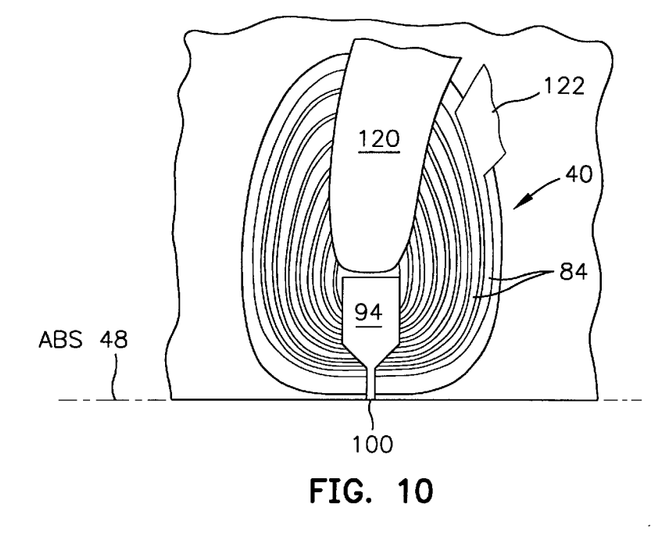
FIG. 10 is a view taken along plane 10—10 of FIG. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
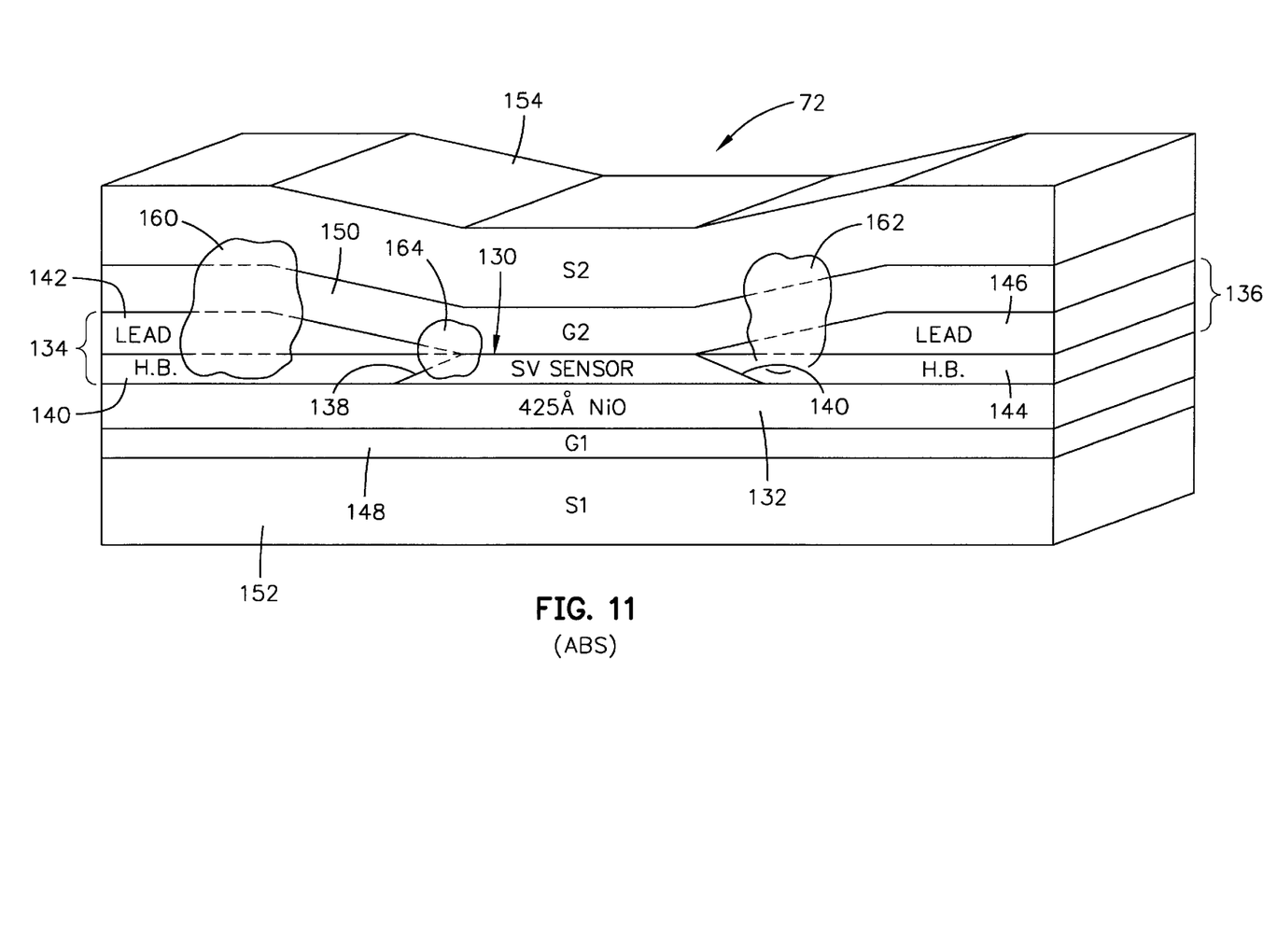
FIG. 11 is an isometric ABS illustration of a read head which employs an AP pinned spin valve (SV) sensor.

FIG. 11 is an isometric ABS illustration of the read head 72 shown in FIG. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer is preferably 425 A of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

When the lead layers 142 and 146 are made of gold (Au) there has been a problem of nodule growth at the ABS as shown by the nodules 160, 162 and 164 in FIG. 11. The nodules 160 and 162 show a shorting of the leads 142 and 146 to the second shield layer 154 while the nodule 164 bridges across edges (not shown) of magnetic layers of the spin valve sensor 130. These nodules destroy the operation of the read head. While gold (Au) is very desirable as a material for conductor leads because of its high conductivity (low resistance) and resistance to corrosion at the ABS, it grows nodules at operating temperatures of the read head, which temperatures can range from 80° C.–120° C. At operating temperatures other layers of the read head, such as the pinning layer 132, the hard bias layers 140 and 144, the first and second gap layers 148 and 150 and the first and second shield layers 152 and 154, exert a pressure on the leads 142 and 146 which cause the leads to be extruded at the ABS like toothpaste from a tube thereby shorting the leads to the shields. For this reason, tantalum (Ta) is typically substituted for gold (Au) in the first and second leads 142 and 146. Unfortunately, tantalum (Ta) has a resistance more than five times that of gold (Au). In order to carry the sense current and lower the generation of heat, tantalum (Ta) leads have to be made significantly thicker than gold (Au) leads which causes write gap curvature, as discussed hereinabove.

Figure 12:
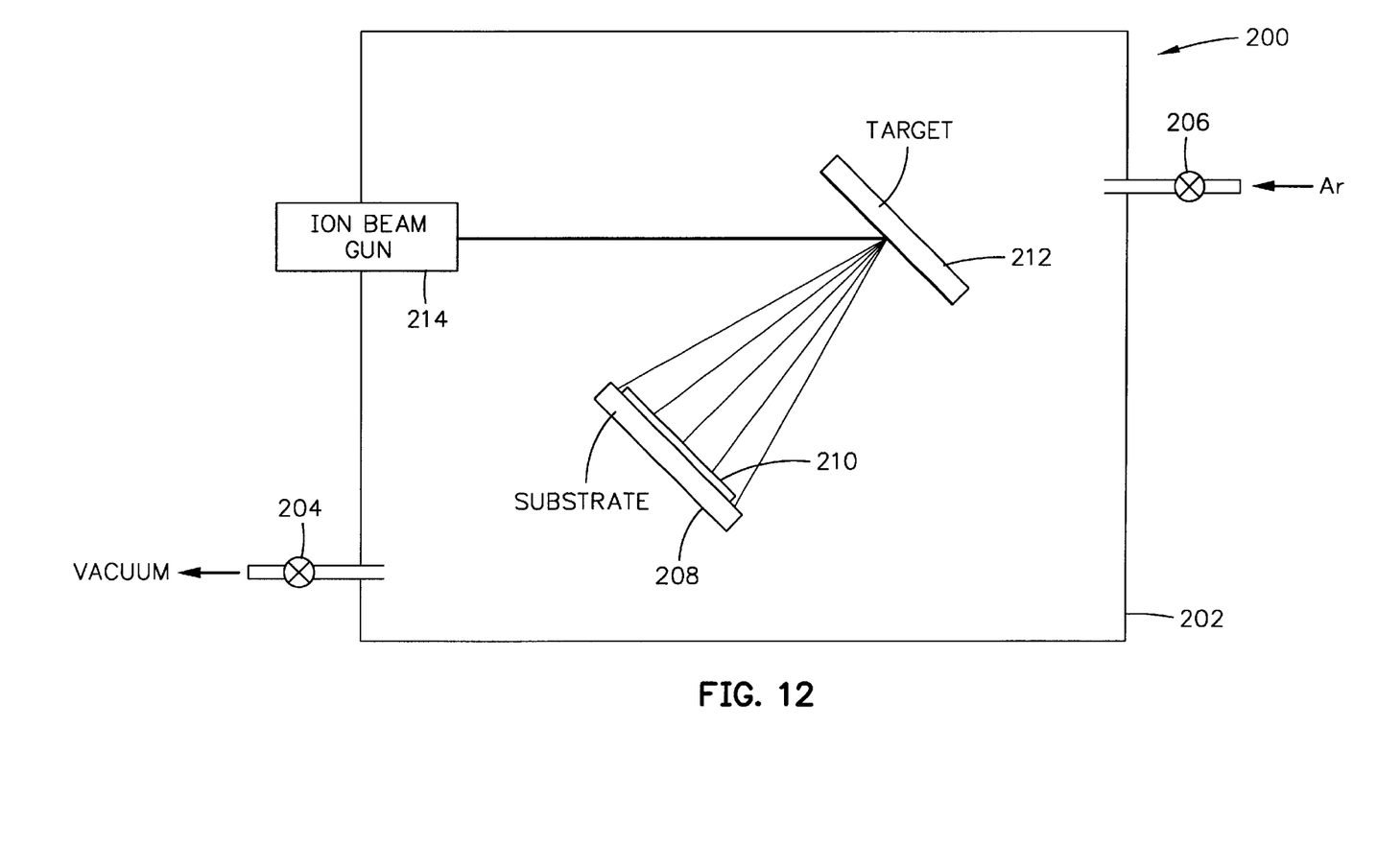
FIG. 12 is a schematic illustration of a prior art ion beam sputtering chamber for forming prior art lead layers wherein surface planes of the substrate and the target are parallel with respect to one another.

The prior art sputtering system 200 for forming the leads 142 and 146 in FIG. 11 is shown in FIG. 12. The sputtering system 200 includes a chamber 202 which has a valve controlled outlet 204 and a valve control inlet 206. The outlet 204 is for the purpose of drawing a vacuum in the chamber and the inlet 206 is for the purpose of introducing an inert gas, such as Argon (Ar), into the chamber. Mounted within the chamber is a substrate 208 which supports a wafer 210 upon which layers of the read head are formed, such as the first and second lead layers 142 and 146 in FIG. 11. Opposite the wafer and substrate is a target 212 composed of the material to be sputter deposited on the wafer 210. An ion beam gun 214 may be mounted at one end of the chamber 202 for the purpose of directing a beam of ions onto the target 212. Within the ion beam gun high energy electrons collide with atoms, such as argon (Ar) or xenon (Xe) atoms, knocking out one of the electrons of each atom causing atoms to be ionized with a positive charge. Electrons knocked out of the atoms have high energy which knock out additional electrons from other atoms which creates a plasma within the ion beam gun 214. Ionized atoms from the ion beam gun strike the target 212 which causes the material of the target to be sputtered and deposited on the wafer 210. In a prior art sputter system 200 the nominal planes of the substrate 208 and the target 212 are substantially parallel with respect to one another. When the nominal planes are parallel this results in non-oblique sputtering of atoms onto the substrate.

The Invention

Figure 13:
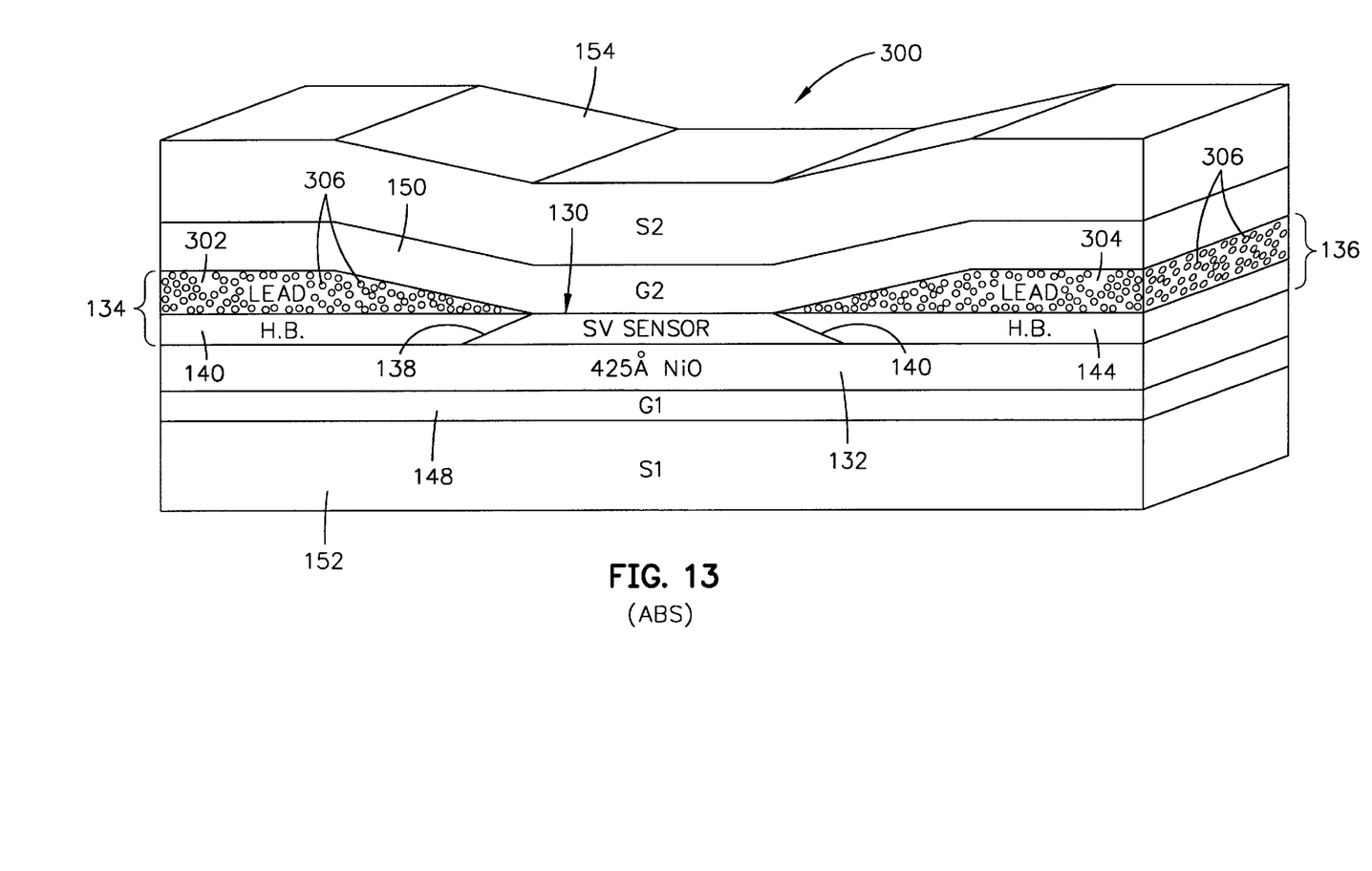
FIG. 13 is the same as FIG. 11 except the lead layers have a reduced density due to the present method of making the lead layers.

The present invention is illustrated in the read head 300 shown in FIG. 13 which is the same as the read head 72 shown in FIG. 11 except for the lead layers 302 and 304. Assuming the same elemental material or materials for the lead layers in FIGS. 11 and 13 the lead layers 302 and 304 in FIG. 13 have a reduced density as compared to the density of the lead layers 142 and 146 in FIG. 11. The reason that the lead layers 302 and 304 are less dense is because of micro voids at the atomic level in the material of the lead layers, as shown at 306. The lead layers 302 and 304 can be referred to as being porous because of the micro voids 306 at the atomic level even though the lead layers may not be porous to a liquid such as water. The importance of the micro voids 306 is that when the read head 300 is subjected to operating pressures and temperatures the material of the leads 302 and 304 will not be extruded at the ABS to cause nodules, as discussed hereinabove. When the lead layers are subjected to the operating pressures and temperatures the material of the leads 302 and 304 collapses into the voids 306 so as to prevent an extrusion of the lead material at the ABS. This is especially useful for lead layers 302 and 304 which are composed of gold (Au) or gold (Au) alloys. At the operating pressures and temperatures a minute collapse of the gold lead layers into the voids 306 prevents the undesirable extrusion.

Figure 14:
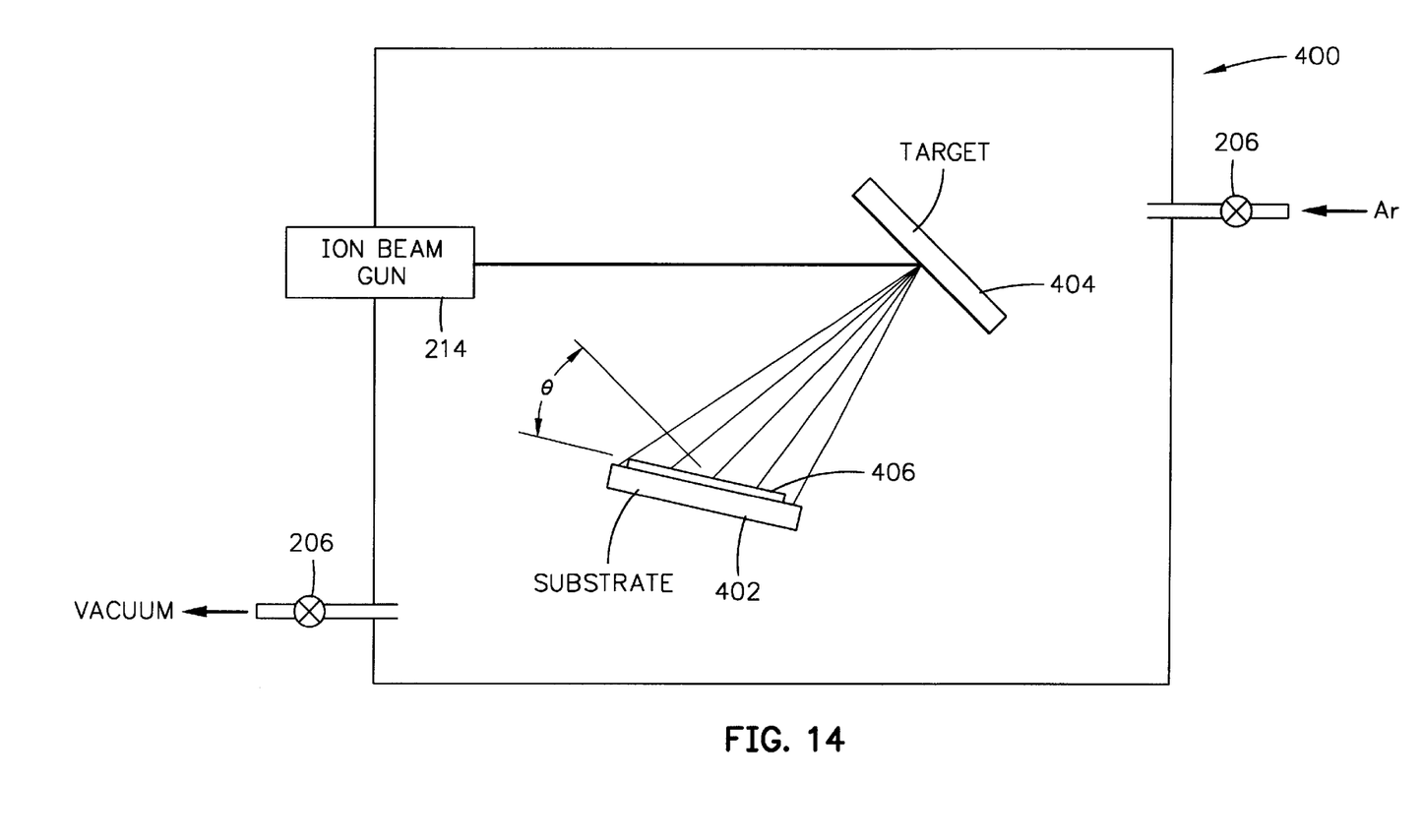
FIG. 14 illustrates the present ion beam sputtering chamber which is the same as the sputtering chamber in FIG. 12 except the surface planes of the substrate and the target are at an angle with respect to one another.

The present sputtering system 400 for forming the leads 302 and 304 in FIG. 13 is shown in FIG. 14. The sputtering chamber 400 is the same as the sputtering chamber 300 except for the substrate 402 and the target 404. The difference is that the nominal planes of the substrate 402 and 404 are oriented at an angle θ with respect to one another instead of being parallel with respect to one another as shown in FIG. 12. While the angle θ is shown in the plane of the paper, angle θ can be located at any angle within 360° commencing with the plane of the paper and rotated into and out of the paper back to the plane of the paper which will be described in more detail hereinafter. With this arrangement atoms of the material sputtered from the target 404 are deposited on the wafer 406 at an angle to a normal to the nominal surface plane of the substrate. I have found that this oblique sputtering results in the lead layers having a reduced density due to the micro voids 306 in the lead layers shown in FIG. 13. The preferred angle θ is from 20°–40°. The chamber pressure can be $10^{-4}$ torr and the working gas may be argon (Ar), krypton (Kr) or xenon (Xe). The preferred target material is gold (Au). In another preferred embodiment the target material may be a gold alloy such as gold nickel (AuNi), gold copper (AuCu) or gold tantalum (AuTa).

Figure 15:
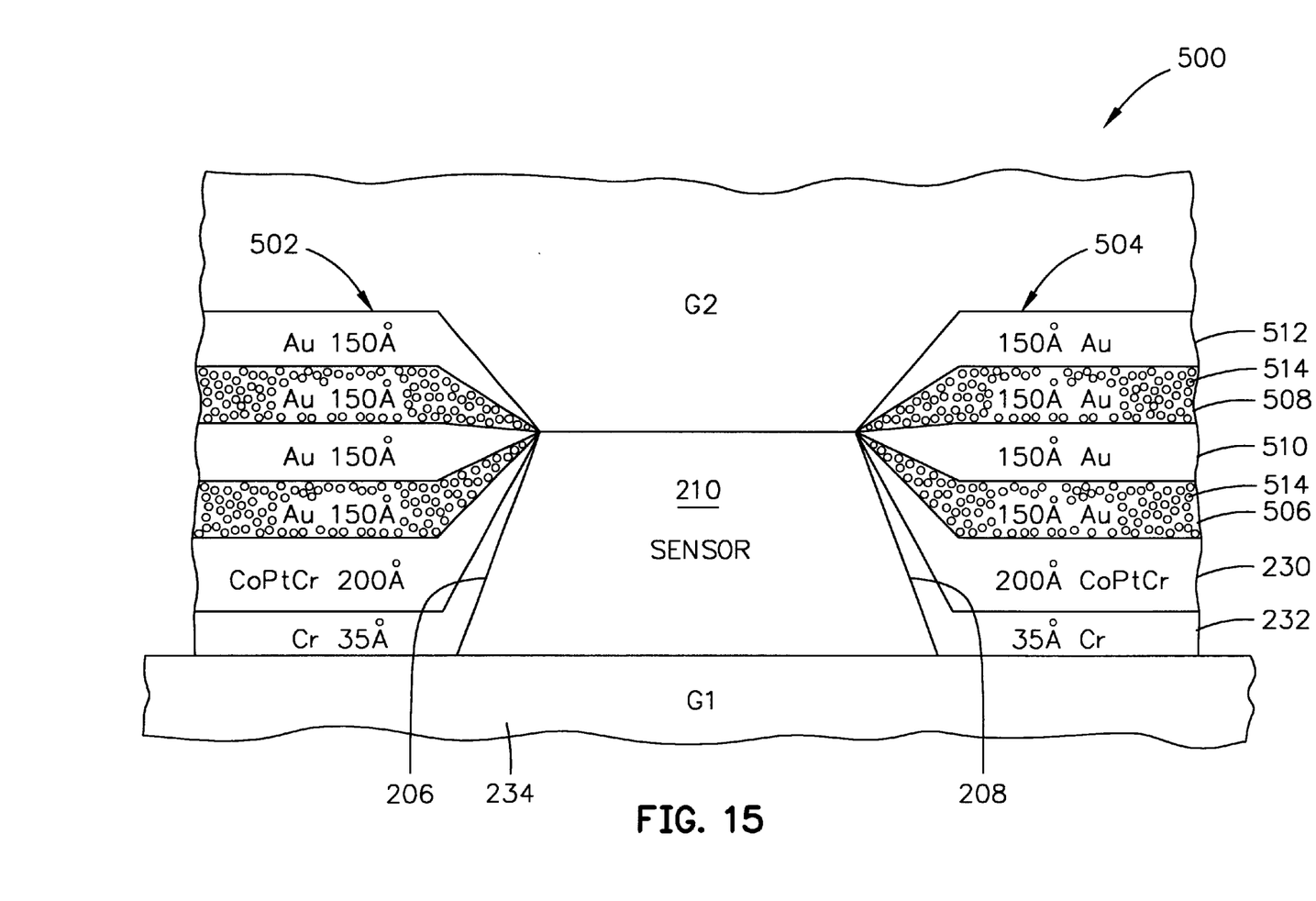
FIG. 15 is an ABS illustration of a read head showing a second embodiment of the present invention.

While each of the lead layers 302 and 304 in FIG. 13 comprise, in one embodiment, a single layer, another embodiment of the read head 500 is illustrated in FIG. 15 wherein each of the lead layers 502 and 504 comprise multilayers of the same material, except alternate layers of the same material are less dense or porous according to the present invention. Accordingly, each of the lead layer structures 502 and 504 may include less dense material layers 506 and 508 which are alternately formed with respect to natural density material layers 510 and 512. In the preferred embodiment the layers 506, 508, 510 and 512 are composed of gold (Au). Performance of the gold (Au) lead layer structures 502 and 504 can be similar to the lead layers 302 and 304 shown in FIG. 13. When subjected to operating pressures and temperatures the gold layers 510 and 512 will collapse minutely into the layers 506 and 508 because of the voids 514 in these layers, thereby obviating the aforementioned nodule growth.

Figure 16:
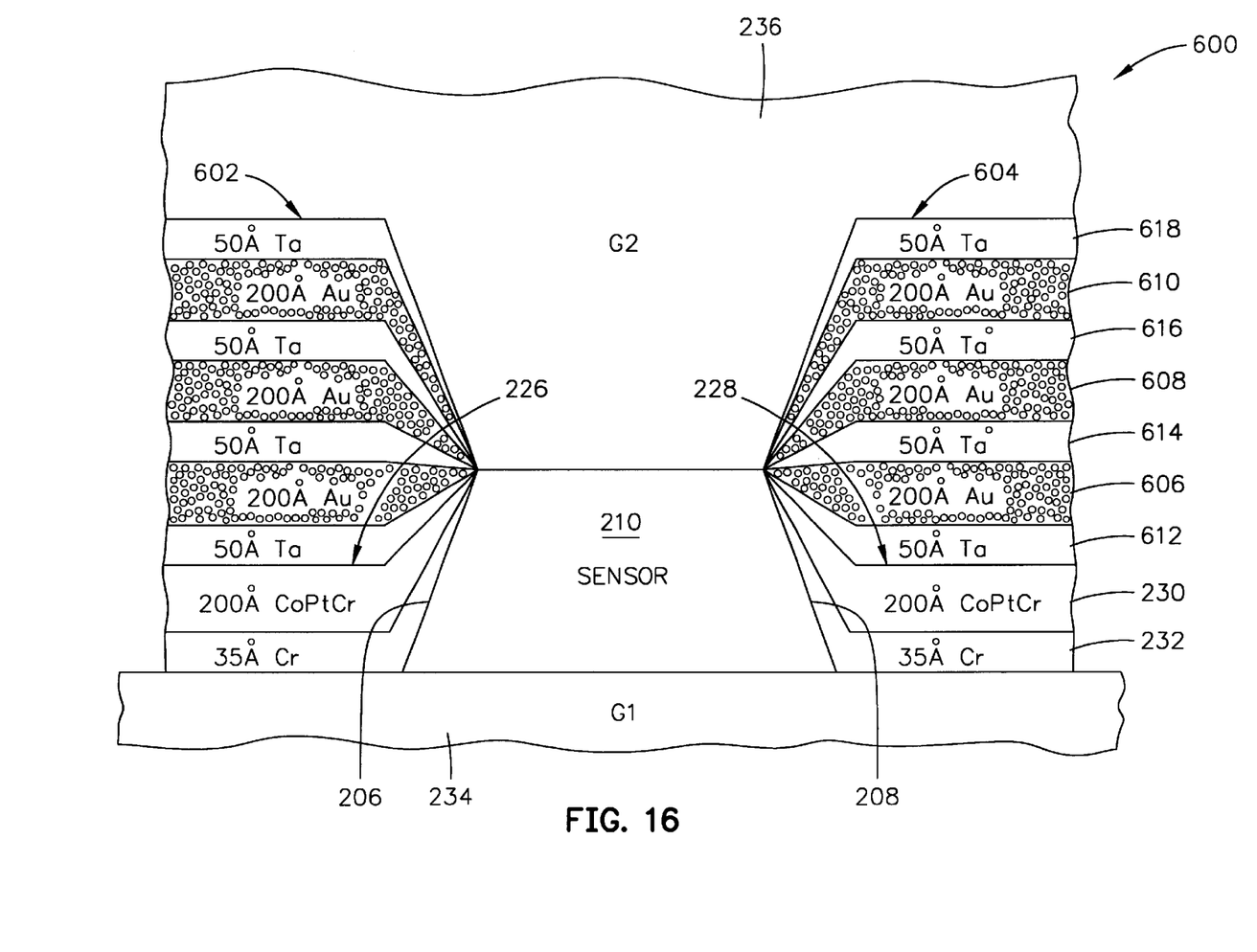
FIG. 16 is an ABS illustration of the read head showing a third embodiment of the present invention.

Still another embodiment 600 of the read head with first and second lead layer structures 602 and 604 is shown in FIG. 16. Each of the lead layer structures 602 and 604 includes low density metallic layers, such as gold (Au), 606, 608 610 with reduced density according to the present invention interleaved with tantalum (Ta) layers 612, 614, 616 and 618. The tantalum (Ta) layers which, may be 50 Å thick as compared to 200 Å thick for the gold layers, provide a desired structural support for the gold layers.

With the present invention the density of the gold (Au) can be reduced from 19.3 gm/cc for element gold to 15.0 gm/cc. In a preferred embodiment the invention encompasses gold (Au) lead layers with a density from 15.0 gm/cc to 19.0 gm/cc.

Figure 17:
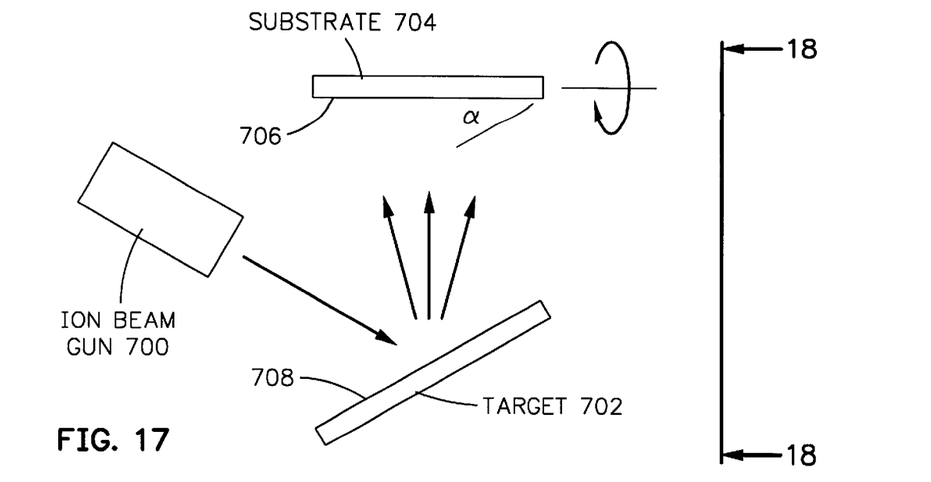
FIG. 17 is a schematic illustration of an ion beam gun, target and substrate.
Figure 18:
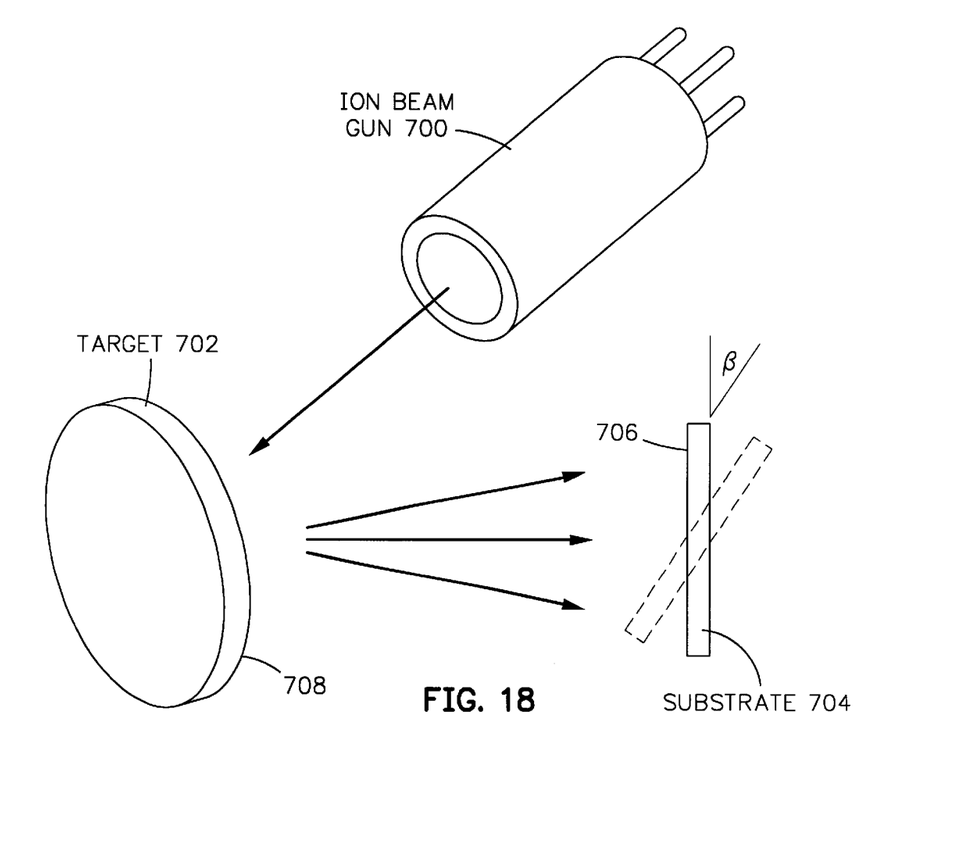
FIG. 18 is a view taken along plane 18—18 of FIG. 17.

FIGS. 17 and 18 are schematic diagrams of an ion beam gun 700, a target 702 of some metal and a substrate 704 to illustrate various angles α and β that a nominal surface plane of the substrate can make with respect to a nominal surface plane of the target in order to achieve a non-parallel relationship therebetween of angle θ described for FIG. 14 for the purpose of achieving oblique sputtering of the metal onto the substrate with a reduced density. Either angle α or β or a combination of the angles results in oblique sputtering (non-normal flux flow) from the center of the target to the center of the substrate. In FIG. 17 the surface plane 706 of the substrate 704 is rotated about an axis perpendicular to the paper with respect to the surface plane 708 of the target and in FIG. 18 the surface plane of the substrate shown in phantom is further rotated by an angle β about an axis perpendicular to the paper with respect to the surface plane 708 of the target. Either the target 702 or the substrate 704 may be maintained stationary while the other is rotated by angles α and/or β to achieve a non-parallel relationship of angle θ therebetween as shown in FIG. 14.

It should be understood that the present invention may be employed for metals other than gold, gold alloy, copper or molybdenum. Further, the sensor 210 may be a spin valve sensor or an AMR sensor, as discussed hereinabove. Further, the first and second leads may overlap the top of various layers of the sensor with a space between the leads for defining the active region of the sensor. This is known in the art as a continuous junction sensor as contrasted to the contiguous junction sensor described hereinabove. Still further, the invention applies to any thin film leads, such as leads connected to the write head of a magnetic head assembly.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:

a read sensor;

first and second lead layers electrically connected to the read sensor;

nonmagnetic nonconductive first and second read gap layers;

the read sensor and the first and second lead layers being located between the first and second read gap layers;

the lead layers being composed of a nonmagnetic metal; and the nonmagnetic metal having a reduced density which is less than a density of the nonmagnetic metal when non-obliquely sputtered to provide resistance against nodule growth at an air bearing surface.

2. A magnetic read head as claimed in claim 1 including:

ferromagnetic first and second shield layers; and the first and second read gap layers being located between the first and second shield layers.

3. A magnetic read head as claimed in claim 2 wherein the metal is copper (Cu).

4. A magnetic read head as claimed in claim 2 wherein the metal is molybdenum (Mo).

5. A magnetic read head as claimed in claim 2 wherein the metal is a gold alloy.

6. A magnetic read head as claimed in claim 2 wherein the metal is gold (Au).

7. A magnetic read head as claimed in claim 6 wherein the gold has a reduced density in a range of 15 gm/cc to 19 gm/cc.

8. A magnetic read head as claimed in claim 7 wherein each lead layer structure includes alternate lead layers wherein every other lead layer is said gold (Au) with a reduced density.

9. A magnetic read head comprising:

a read sensor;

first and second lead layers electrically connected to the read sensor;

nonmagnetic nonconductive first and second read gap layers;

the read sensor and the first and second lead layers being located between the first and second read gap layers;

ferromagnetic first and second shield layers;

the first and second read gap layers being located between the first and second shield layers; and the lead layers being composed of porous gold which has been obliquely sputtered to provide resistance against nodule growth at an air bearing surface.

10. A magnetic read head as claimed in claim 9 wherein the gold has a porosity which prevents flow of the gold when subjected to pressure greater than ambient and heat in a range of 80° to 120° C.

11. A magnetic read head as claimed in claim 10 wherein each lead layer structure includes alternate lead layers wherein every other lead layer is said gold (Au) with a reduced density.

12. A magnetic head assembly having a read head and a write head and an air bearing surface (ABS) comprising:

the write head including:

first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gaps portions; and the read head including:

a read sensor;

first and second lead layers electrically connected to the read sensor;

nonmagnetic nonconductive first and second read gap layers;

the read sensor and the first and second lead layers being located between the first and second read gap layers;

the lead layers being composed of a nonmagnetic metal; and the metal having a reduced density which is less than a density of the metal when non-obliquely sputtered to provide resistance against nodule growth at the air bearing surface.

13. A magnetic head assembly as claimed in claim 12 including:

the read head further including:

a ferromagnetic second shield layer;

a nonmagnetic electrically insulative separation layer; and the separation layer being located between the second shield layer and the first pole piece layer.

14. A magnetic head assembly as claimed in claim 12 wherein the metal is gold (Au).

15. A magnetic head assembly as claimed in claim 14 wherein the gold has a reduced density in a range of 15 gm/cc to 19 gm/cc.

16. A magnetic head assembly as claimed in claim 15 wherein each lead layer structure includes alternate lead layers wherein every other lead layer is said gold (Au) with a reduced density.

17. A magnetic disk drive having at least one slider that has an air bearing surface (ABS), the slider supporting at least one magnetic head assembly that includes a read head and a write head, the disk drive comprising:

the write head including:

first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gaps portions; and the read head including:

a read sensor;

first and second lead layers electrically connected to the read sensor;

nonmagnetic nonconductive first and second read gap layers;

the read sensor and the first and second lead layers being located between the first and second read gap layers;

the lead layers being composed of a nonmagnetic metal;

the metal having a reduced density which is less than a density of the metal when non-obliquely sputtered to provide resistance against nodule growth at the air bearing surface;

a ferromagnetic first shield layer; and the first and second read gap layers being located between the first shield layer and the first pole piece layer;

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

spindle motor for rotating the magnetic disk;

an actuator means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

18. A magnetic disk drive as claimed in claim 17 including:

the read head further including:

a ferromagnetic second shield layer;

a nonmagnetic electrically insulative separation layer; and the separation layer being located between the second shield layer the first pole piece layer.

19. A magnetic disk drive as claimed in claim 17 wherein the metal is gold (Au).

20. A magnetic disk drive as claimed in claim 19 wherein the gold has a reduced density in a range of 15 gm/cc to 19 gm/cc.

21. A magnetic disk drive as claimed in claim 20 wherein each lead layer structure includes alternate lead layers wherein every other lead layer is said gold (Au) with a reduced density.

22. A method of making a read head comprising the steps of:

providing a substrate that has a nominal surface plane;

forming a nonmagnetic nonconductive first read gap layer on the top of the substrate's nominal surface plane;

forming a read sensor on the first read gap layer;

forming and electrically connecting nonmagnetic conductive first and second lead layers to the read sensor which comprise the steps of:

providing a sputtering chamber;

providing a nonmagnetic conductive metallic target in the sputtering chamber that has a nominal surface plane;

positioning the substrate in the chamber with its nominal surface plane at an angle to the nominal surface plane of the target; and employing an ion beam gun in the chamber to bombard the target with ions which cause metallic ions to be sputtered from the target and deposited on the substrate to form said leads, so as to provide resistance against nodule growth at an air bearing surface.

23. A method as claimed in claim 22 wherein the metal is gold (Au).

24. A method as claimed in claim 23 wherein the angle is sufficient to cause the gold to have a reduced density that prevents the leads from flow when subjected to pressure above ambient and heat in a range of 80° C. to 120° C.

25. A method as claimed in claim 24 wherein the angle is from 20° to 40°.

26. A method as claimed in claim 25 wherein each lead layer is formed with alternate lead layers with every other lead layer being said gold (Au) with a reduced density.

27. A method of making a magnetic head assembly that has a read head and write head and an air bearing surface (ABS) comprising the steps of:

making the read head as follows:
  providing a substrate that has a nominal surface plane;
  forming a nonmagnetic nonconductive first read gap layer on the top of the substrate's nominal surface plane;
  forming a read sensor on the first read gap layer;
  forming and electrically connecting nonmagnetic conductive first and second lead layers to the read sensor which comprise the steps of:
  providing a sputtering chamber;
  providing a nonmagnetic conductive metallic target in the sputtering chamber that has a nominal surface plane;
  positioning the substrate in the chamber with its nominal surface plane at an angle to the nominal surface plane of the target;
  employing an ion beam gun in the chamber to bombard the target with ions which causes atoms to be sputtered from the target and deposited on the substrate to form said leads, so as to provide resistance against nodule growth at an air bearing surface; and making the write head as follows:
  forming a ferromagnetic first pole piece layer on the second read gap layer that has a yoke region between a pole tip region and a back gap region;
  forming a nonmagnetic nonconductive write gap layer on the first pole piece layer in the pole tip region and forming an insulation stack with at least one coil layer embedded therein on the first pole piece layer in the yoke region; and
  forming a ferromagnetic second pole piece layer on the write gap layer and the insulation stack and connected to the first pole piece at the back gap region.

28. A method as claimed in claim 27 wherein the making of the read head further includes:
  before forming the first pole piece layer forming a ferromagnetic second shield layer on the second read gap layer;
  forming a nonmagnetic nonconductive separation layer on the second shield layer; and
  forming said first pole piece layer on the separation layer.

29. A method as claimed in claim 27 wherein the metal is gold (Au).

30. A method as claimed in claim 29 wherein the angle is sufficient to cause the gold to have a reduced density that prevents the leads from flow when subjected to pressure above ambient and heat in a range of 80° C. to 120° C.

31. A method as claimed in claim 30 wherein the angle is from 20° to 40°.

32. A method as claimed in claim 31 wherein each lead layer is formed with alternate lead layers with every other lead layer being said gold (Au) with a reduced density.

* * * * *